United States Patent [19]

Schlachter et al.

[11] 4,252,550

[45] Feb. 24, 1981

[54] METHOD AND APPARATUS FOR THE INTEGRATION OF NEWLY FORMED FILAMENTS INTO A CONTINUOUS STRAND

[75] Inventors: Fredo E. L. Schlachter, Johannesberg; Heinz P. Keib; Dieter G. Kahnke, both of Wertheim; Christian Beck, Hasloch, all of Fed. Rep. of Germany

[73] Assignee: Glaswerk Schuller GmbH, Wertheim Main, Fed. Rep. of Germany

[21] Appl. No.: 35,123

[22] Filed: May 1, 1979

[51] Int. Cl.³ .............................................. C03B 37/02
[52] U.S. Cl. .............................................. 65/2; 65/10; 65/11 W; 264/559; 425/66
[58] Field of Search .................. 65/2, 10, 11 R, 11 W; 425/66, 103; 264/559, 543

[56] References Cited

U.S. PATENT DOCUMENTS

| | | | |
|---|---|---|---|
| 3,008,183 | 11/1961 | Schuller et al. | 65/11 W X |
| 3,492,103 | 1/1970 | Schuller et al. | 65/2 X |
| 3,623,853 | 11/1971 | Keib | 65/2 |
| 3,766,003 | 10/1973 | Schuller et al. | 65/11 W |

FOREIGN PATENT DOCUMENTS

| | | |
|---|---|---|
| 1062399 | 7/1959 | Fed. Rep. of Germany . |
| 1246937 | 8/1967 | Fed. Rep. of Germany . |
| 1796143 | 2/1972 | Fed. Rep. of Germany . |

*Primary Examiner*—Robert L. Lindsay, Jr.
*Attorney, Agent, or Firm*—R. M. Krone; J. J. Kelly; W. C. Anderson

[57] ABSTRACT

This invention relates to a method and apparatus for integrating a newly formed continuous filament into a continuous strand. Mechanically complicated prior integration devices are usually expensive to purchase and operate and do not always ensure that the initially formed section of the new filament is separated from the new filament, that the fiber diameter of the new filament is predrawn sufficiently for ready integration, or ensure the reliability of the guiding elements facilitating integration. The present invention includes the operations of drawing a plurality of continuous filaments 3 from a bushing 1 into a fiber fan 4 by gathering the filaments 3 into a continuous strand 6 at a deflection point or roller 5. Should one of the filaments 3 break, a new continuous filament 8 is formed which is deflected by a guide plate 9 toward the point 5. A water stream 13 separates the filament 8 from its associated initially formed section and concomitantly predraws the filament 8 to an initial fiber diameter conducive to integration. The filament 8 is further predrawn and conducted by the stream 13 between guide bars 15 to a point 5 where the strand 6 and the filament 8 are jointly deflected along a common path X defined at least by the point 5 and another point or roller 7 such that the newly formed filament 8 is drawn to its final fiber diameter and integrated with strand 6.

15 Claims, 3 Drawing Figures

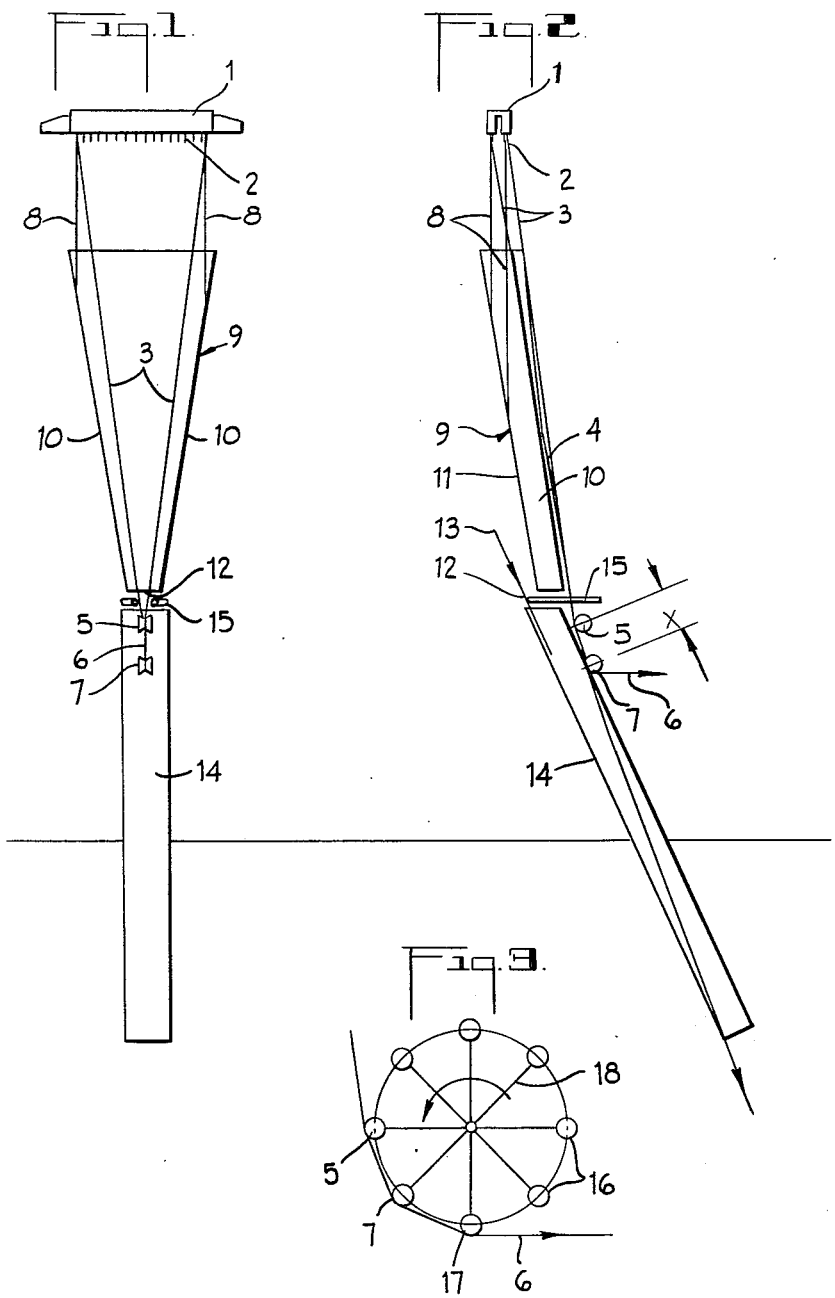

METHOD AND APPARATUS FOR THE INTEGRATION OF NEWLY FORMED FILAMENTS INTO A CONTINUOUS STRAND

TECHNICAL FIELD

This invention relates to a method and apparatus for producing glass and similar plastic filaments and more particularly to a method and apparatus for integrating newly formed filaments into a moving continuous strand.

BACKGROUND OF PRIOR ART

The operation of drawing continuous filaments into a fiber fan, gathering them into a strand, and winding them on bobbins is well known. When glass is used as the raw material the product thus formed, hereinafter referred to as "continuous strands" may be used for widely varying purposes. In the form of fabrics, rovings, or in the form of cut short pieces or staples, the products serve advantageously as an insulating medium or as reinforcing means. Furthermore, the continuous strands may be used in the fabrication of a wet fiber mat typified by U.S. Pat. No. 3,766,003. In the plastics industry substantial quantities of continuous strands are used as reinforcement for glass fiber-reinforced plastics.

In order to ensure uniformity of the continuous strand, breakage of the individual continuous filaments must be avoided during the winding operation when the filaments are being drawn about the bobbin. This is difficult to accomplish since even slight variations in homogeneity, fluctuations of temperature during the filament formation or spinning process and the like, may be sufficient to cause the continuous glass filaments, which are relatively delicate, to break. In the production of continuous strands from a continuous glass filament a particular difficulty resides in producing new filaments sufficiently quickly to replace the broken filaments, and in introducing or integrating these newly formed filaments into the continuous strand of filaments being wound on the bobbin. When a continuous filament breaks or is otherwise terminated during the collection of the continuous filaments from the fiber fan into the continuous strand, a new filament is formed at the filament former or bushing by a newly formed drop or bead of glass which drops vertically under the influence of gravity from an orifice at the bushing and pulls the new filament along. The gradual transition from the drop to the new filament has been called a "cone," "needle" or "icicle" and together with the drop constitute the initially formed section of the new filament. The newly formed filament can be integrated into the moving continuous strand only after it has been separated from its associated drop and needle. It is also known that integration also requires that the newly formed filament be predrawn such that its diameter is substantially as fine as the fiber diameter of the other filaments making up the continuous strand.

Known devices for integrating such newly formed filaments include German Pat. No. 1,062,399 and German Pat. No. 1,246,937 which incorporate a V-shaped trough which extends longitudinally underneath the point where the filaments are formed. The V-shaped trough deflects a newly formed filament from the direction of its vertical fall and allows the newly formed filament to be conducted by means of mechanical devices to a joining rotating drawing drum which aids in the joining of the new filament with the continuous strand being formed. The drum separates the new filament from its associated drop and needle, predraws it to a preliminary fiber diameter, draws it into a filament of proper thickness and thereafter conducts the newly formed filament toward the direction of the continuous strand into which it may then be integrated with the help of a mechanical thread guide.

In practice, however, this known apparatus does not always ensure that the drops and needles are safely caught by the rapidly rotating drawing drum. The drops and needles tend to be relatively inflexible and are rarely able to conform to the circumference of the rotating drum and thus tend to rebound from the drum. Additionally, guide and deflector plates which surround the drum and prevent the newly formed filament from being projected in an undesired direction, interfere with and render the transfer of the predrawn filament to its respective place in the continuous strand more difficult. This complicated device suffers from additional disadvantages including high wear of the rotating drawing drum, integrating mechanical thread guide and the rapidly moving mechanical conducting or guiding devices, due to the high abrasiveness of the continuous glass filaments. Furthermore, the rapidly rotating joining drawing drum necessitates high manufacturing standards and needs to be precisely balanced and supported in bearings. Moreover, faultless performance of the device requires constant servicing and lubrication. Thus, the known devices entail high initial capital expenditure and operational costs.

In the production of rayon fibers a plurality of single fibers are drawn parallel to each other from a rapidly rotating drawing drum, lifted or separated from the drum before reaching a complete winding around the surface of the drum and divided into rayon fibers which are then further processed into a flat fiber formation, such as mats or fibrous webs, or into velvety roves or fiber bands. German laid-open Patent Application 1,796,143 teaches that the above-described joining rotating drawing drum and other mechanical parts may be dispensed with in the production of rayon fibers by utilizing water as a guiding medium in order to predraw the filaments and subsequently guide the filaments to a drawing drum.

Apparently this method is feasible in the production of rayon fibers because a rapidly rotating drawing drum is still used such that the individual filaments can run parallel to and separated from each other by a slight distance. Using streams of water allows the individual filaments to be predrawn to a desired preliminary diameter without the combined steps of predrawing and drawing to a final fiber diameter as in the case with the heretofore-described joining drum. Unfortunately, the efficient predrawing device disclosed by German laid-open Patent Application 1,796,134 has not proved adaptable to the integration of newly formed filaments into a continuous strand of glass filaments.

BRIEF SUMMARY OF INVENTION

It is therefore an object of the present invention to provide a method and apparatus for continuously predrawing and integrating newly formed filaments into a continuous strand.

A further object of the present invention is to provide an apparatus for forming continuous strands of glass filaments which is uncomplicated, inexpensive and long lasting.

These and other objects are accomplished in the present invention by deflecting a continuous strand, which is collected from a fiber fan, among several deflecting points from the center plane of the fiber fan into a particular direction. The predrawing of a newly formed filament and the separation of the associated drops and needle is accomplished by utilizing a liquid stream means. A newly formed filament may thus be conducted to a first deflection point of the continuous strand where it may be caught by the continuous strand and drawn via a "common" deflection path between the points of deflection of the continuous strand to a desired fiber diameter.

BRIEF DESCRIPTION OF THE DRAWINGS

The invention is diagrammatically illustrated by way of example and the accompanying drawings wherein:

FIG. 1 is a simplified front elevational view of an apparatus embodying the method of the present invention, FIG. 2 is a side elevational view of the apparatus of FIG. 1, FIG. 3 is a side elevational showing modifications of a part of the apparatus illustrated in FIGS. 1 and 2.

DETAILED DESCRIPTION OF THE INVENTION

While a series of fiber forming means or bushings would be used in actual practice, FIGS. 1 and 2 illustrate a single bushing 1 which comprises an array of fiber spinning nipples or orifices 2 from which fine diameter streams of molten glass flow and are drawn into fibers or filaments 3. The filaments 3, as shown in FIG. 1, represent the outer extremity of a fiber fan 4 which comprises a plurality of continuous filaments 3. The individual filaments 3 forming the fiber fan 4 may be collected at a first deflection roller or a point 5 into a continuous strand 6 which may be drawn over a second deflection roller or a point 7 in the direction of the arrow (see FIG. 2) and guided by suitable means to a winding device or bobbin (not shown). Rollers 5, 7 may be made of a low friction material such as graphite and preferably are constructed with a V-shaped groove running along their outer periphery.

As is well known, after a filament 3 breaks or tears, a glass drop or bead forms on the respective orifice or nozzle 2, which, after reaching a sufficient size, sinks vertically downward under the influence of gravity so that a cone, needle or icicle forms which is further drawn ultimately resulting in a newly formed filament 8. Two of these newly formed filaments are indicated in FIG. 1. As best shown in FIG. 1, during this sinking movement, the filaments 8 hit a funnel-shaped guide plate 9 comprising downward converging sidewalls 10 and a transverse forwardly extending inclined rear wall 11.

The filaments 8 and their associated drops and needles are deflected by the guide plate 9 from their direction of sinking or falling and are guided toward the center of the guide plate 9 and toward the continuous strand 6. The glass drops, the needles and the trailing newly formed filaments 8 are caught by a strong stream of cold water 13 beneath the lower edge 12 of the guide plate 9. Each of the filaments 8 is predrawn and the associated glass drop and needle of each of the filaments 8 is separated by the chilling effect of the cold water 13 so that the drop and needle are blasted into a fine granulate. The resultant granulate is carried away through a water trough 14 as each of the newly formed filaments 8 is carried along by the stream of water 13. The new filaments 8 are further predrawn and conducted between stationary guiding or conducting bars 15 to the first deflection point 5 by the water stream 13.

The newly formed filaments 8 are caught by the moving continuous strand 6 and are conducted and drawn along a "common" deflection path X to a final fiber diameter fineness. Within the path X the deflection points 5 and 7 draw the filaments 8 to the final fineness thereby performing the same function as the heretofore used expensive and intensively serviced joining rotating drawing drums. The stream of water 13 performs not only the role of a mobile mechanical guiding means which, in the past, led the newly formed threads to the joining rotating drawing drums thereby facilitating the integration of the predrawn filaments into the moving continuous strand but also predraws the filaments in a fashion similar to the prior art joining rotating drawing drums.

Although it is basically possible to deflect the filaments 3 laterally outward using a trough which is inclined merely with respect to the longitudinal direction of the bushing 1 as in the known integration devices further represented by U.S. Pat. No. 3,008,183, the present invention effects not only a lateral deflection of the filaments 3 but also conducts the filaments 3 away from the area of the falling drops which form the new filaments 8 (see FIG. 2). An advantage of the present invention is that the free fall length of the drops can be shortened which is especially important with respect to the multi-row nozzle bushings presently used because if the glass drops fall and swing along a longer fall path they can very easily swing into the emanating fiber fan 4 and cause additional filaments 3 to break.

It has also proven advantageous to moisten the deflecting rollers 5,7 with an agent such as water containing additives such as a black wash, sizing or similar lubricating agents. A suitable arrangement of spray nozzles may be located proximate the deflecting rollers to provide the wetting agent which may or may not be pressurized, in order to effect a cleansing of the deflecting rollers so that any filament remnants which may eventually adhere to the deflecting rollers can be washed off or removed. In order to avoid any deleterious effect on the continuous strand, the spraying effect of the nozzles should be directed to the side of the rollers opposite to that contacting the strand.

FIG. 3 schematically shows an alternate arrangement of the deflecting rollers in which a number of additional deflection rollers 16 made of a graphite-like material are arranged on a support means 18 rotatable in the arrow-designated direction. The first point of deflection or roller 5, also made of graphite, is especially stressed by its function of collecting the fiber fan 4 and may be rotated by support means 18 when it is worn such that a new roller 16 may rotate into the position of the worn roller 5 through an angle which is related to the number of the available deflection rollers 16. The roller previously used on point 5 can subsequently be used as the deflection point 7 since the load at point 7 is not as high as the load experienced by the roller at point 5 which is incurred as a result of collecting the fiber fan 4 and the newly formed filaments 8 into the continuous strand 6. Of course all of the deflection rollers 16 may be used to replace worn rollers by rotating support means 18 through an appropriate angular displacement.

While the drive of the rotary support 18 may be discontinuous as described above, it can also be continuous. In either case a uniform wear of all deflection rollers 16 may take place while the free or unoccupied deflection rollers may be additionally continuously cleaned by means of a cleaning device (not shown) which removes any remnants of fibers and any build-up of black wash or sizing.

FIG. 3 also illustrates a modification in which roller wear, caused by the movement of the continuous strand 6, may be reduced by reducing the looping angle of the individual deflection rollers by providing one or more additional deflection points 17 whereby the path for drawing the filaments is lengthened so that the path extends between the deflecting points 5, 7 and 17.

The inclination of the sidewalls 10 should not be too great. It is recommended therefore to subdivide the bushings along their lengths when very long bushings are used. The filaments can then be collected along two or more fiber fans by providing two or more guiding and leading devices of the present invention consisting of the guiding plates 9, the streams of water 13, the water trough 14 and the stationary guiding or conducting bars 15 for the newly formed filaments corresponding to the number of fiber fans. By this type of arrangement the total height of the sidewalls 10 and the total height of a guiding and leading device can be kept relatively low.

The invention in its broader aspects is not limited to the specific steps, methods, compositions and improvements shown and described herein, but departures may be made therefrom within the scope of the accompanying claims without departing from the principal of the invention and without sacrificing its chief advantages.

We claim:

1. A process for integrating newly formed filaments derived from torn off filaments occurring during the production of continuous strands of thermoplastic materials, comprising:
   (a) drawing continuous filaments of said thermoplastic material into a fiber fan,
   (b) gathering the filaments in said fiber fan into a continuous strand at a first deflection point,
   (c) utilizing a vertically falling glass drop and needle after one of said continuous filaments is broken in order to form a new filament,
   (d) separating said drop and said needle from the newly formed filament by utilizing a rapidly moving liquid stream,
   (e) predrawing said newly formed filament into an initial fiber diameter by means of said liquid stream,
   (f) conducting said newly formed filament to said first deflection point of said continuous strand by means of said liquid stream,
   (g) joining said newly formed filament with said continuous strand, and
   (h) drawing and deflecting said newly formed filament with said continuous strand along a common deflection path comprising a plurality of deflection points whereby said newly formed filament is drawn to a desired final fiber diameter and simultaneously introduced into and carried along with said continuous strand.

2. The process of claim 1, wherein said continuous strand is deflected from a direction which coincides with a center plane of said fiber fan.

3. The process of claim 1, wherein said newly formed filaments are deflected laterally from said fiber fan and in a direction which corresponds to the vertical fall of said glass drops.

4. An apparatus for integrating a newly formed filament derived from a broken filament occurring during the production of a continuous strand from a plurality of filaments of thermoplastic material, said continuous strand being formed by collecting said filaments at a point, comprising:
   means for forming said new filament after a filament forming a part of said continuous strand breaks,
   means for separating the initially formed section of said newly formed filament and said new filament from the region of said plurality of filaments,
   means forming a liquid stream for separating said newly formed filament from its associated initially formed section, drawing said newly formed filament to an initial fiber diameter and for conducting said newly formed filament into contact with said continuous strand,
   means cooperating with said liquid stream means for guiding said newly formed filament to said collection point,
   means for deflecting said newly formed filament and said continuous strand along a common path defined by a plurality of points so that said newly formed filament may be drawn to its final fiber diameter and integrated with said continuous strand.

5. Apparatus according to claim 4, wherein said separating means comprises a guide plate, said liquid stream means being located beneath the lower edge of said guide plate.

6. Apparatus according to claim 5, further comprising guide bars for guiding said newly formed filament as it is being conducted to said continuous strand by said liquid stream.

7. Apparatus according to claim 5, wherein said guide plate comprises two lateral, downwardly convergent sidewalls and a rear wall inclined relative to the direction of the vertical fall of the initially formed section of said newly formed filament.

8. Apparatus according to claim 4, wherein said common path is defined by a plurality of points and said deflection means comprises a plurality of rollers, said rollers having a V-shaped groove running along their outer circumference.

9. Apparatus according to claim 8, wherein said rollers are made from graphite.

10. Apparatus according to claim 8, further comprising means for wetting said rollers in order to lubricate and clean said rollers.

11. Apparatus according to claim 10, wherein said wetting means comprises a plurality of nozzles directing a wetting agent against said rollers.

12. Apparatus according to claim 11, wherein said nozzles are disposed opposite the side of said rollers contacting said continuous strand and new filament.

13. Apparatus according to claims 8 or 11 wherein said rollers are mounted about a rotary support means.

14. Apparatus according to claim 13, wherein said rotary support means is provided with an intermittent drive in order to intermittently present a new contacting roller to said continuous strand and said new filament when an old contacting roller is worn.

15. Apparatus according to claim 13, wherein said rotary support means is provided with a continuous drive in order to continuously present a different contacting roller to said continuous strand and said new filament.

* * * * *